US008904634B2

(12) United States Patent
Ißler

(10) Patent No.: US 8,904,634 B2
(45) Date of Patent: Dec. 9, 2014

(54) FORGING METHOD FOR PRODUCING A PISTON OR PISTON SKIRT

(75) Inventor: Wolfgang Ißler, Schwaikheim (DE)

(73) Assignee: Mahle International GmbH (DE)

( * ) Notice: Subject to any disclaimer, the term of this patent is extended or adjusted under 35 U.S.C. 154(b) by 156 days.

(21) Appl. No.: 13/533,604

(22) Filed: Jun. 26, 2012

(65) Prior Publication Data

US 2013/0036608 A1 Feb. 14, 2013

(30) Foreign Application Priority Data

Jun. 27, 2011 (DE) ......................... 10 2011 078 145

(51) Int. Cl.
*B23P 15/10* (2006.01)
*B21K 1/18* (2006.01)
*F02F 3/00* (2006.01)

(52) U.S. Cl.
CPC ... *B21K 1/18* (2013.01); *F02F 3/00* (2013.01); *F02F 2200/04* (2013.01)
USPC ..................... 29/888.04; 72/353.2; 123/193.6

(58) Field of Classification Search
CPC .............. B21K 1/18; B23P 15/10; F02F 3/00; F02F 2200/04; F05C 2201/021
USPC ........... 29/888.04, 888.045, 888.047; 72/352, 72/353.2, 358, 359; 92/172, 208; 123/193.6
See application file for complete search history.

(56) References Cited

U.S. PATENT DOCUMENTS 1,835,863 A 12/1931 Greve
2,539,903 A * 1/1951 Gruetjen .................... 29/888.04
4,910,093 A 3/1990 Berchem et al.
6,032,570 A * 3/2000 Koike et al. ..................... 92/222
6,152,017 A * 11/2000 Harrer et al. .................... 92/237
6,205,836 B1 * 3/2001 Yamagata et al. .............. 72/359
6,209,446 B1 * 4/2001 Kurita et al. .................... 92/224

(Continued)

FOREIGN PATENT DOCUMENTS

DE 1210302 B 2/1966
DE 3811200 A1 10/1989

(Continued)

OTHER PUBLICATIONS

International Search Report for PCT/EP2012/061827 dated Oct. 24, 2012.

(Continued)

*Primary Examiner* — Alexander P Taousakis
(74) *Attorney, Agent, or Firm* — Rader, Fishman & Grauer PLLC

(57) ABSTRACT

A forging method for producing a piston skirt having two skirt walls and two box walls connecting the skirt walls may include forging, to the piston skirt, the skirt walls at least slightly conically towards the outside of the piston skirt via a first forging die. The box walls may be forged to the piston skirt, wherein each box wall has a hub inside and a hub outside. The box walls may be moulded via a second forging die, wherein the hub outside of each box wall runs at least one of substantially parallel to the piston axis and slightly sloping to an outside of their hub inside towards a free end of the piston skirt to the outside. The skirt walls may be drawn, simultaneously with moulding of the box walls, into a position that is approximately parallel to the piston axis.

11 Claims, 2 Drawing Sheets

(56) References Cited

U.S. PATENT DOCUMENTS

| | | | | |
|---|---|---|---|---|
| 7,213,337 | B1 * | 5/2007 | Porto et al. | 29/888.04 |
| 8,572,843 | B2 * | 11/2013 | Heraldo et al. | 29/888.04 |
| 2003/0221553 | A1 * | 12/2003 | Glinsner et al. | 92/208 |
| 2009/0010799 | A1 * | 1/2009 | Souda et al. | 420/535 |
| 2009/0301165 | A1 | 12/2009 | Schmitz et al. | |
| 2011/0126947 | A1 * | 6/2011 | Garat | 148/701 |
| 2011/0192023 | A1 | 8/2011 | Seifried et al. | |
| 2012/0100385 | A1 * | 4/2012 | Takemura et al. | 428/577 |
| 2013/0149190 | A1 * | 6/2013 | Iveland et al. | 420/535 |

FOREIGN PATENT DOCUMENTS

| | | | |
|---|---|---|---|
| DE | 102006020861 | A1 | 11/2007 |
| DE | 102009056917 | A1 | 6/2011 |
| EP | 0838587 | A1 | 4/1998 |
| EP | 0971117 | A2 | 1/2000 |
| EP | 1348859 | A2 | 10/2003 |
| EP | 1614885 | A2 | 1/2006 |

OTHER PUBLICATIONS

German Search Report for DE102011078145.5.

* cited by examiner

FORGING METHOD FOR PRODUCING A PISTON OR PISTON SKIRT

CROSS-REFERENCES TO RELATED APPLICATION

This application claims priority to German patent application DE 102011078145.5, filed Jun. 27, 2011, which is hereby incorporated by reference in its entirety.

TECHNICAL FIELD

The present invention relates to a forging method for producing a piston or piston skirt. The invention additionally relates to a piston skirt produced according to this method and a forging device for carrying out the method.

BACKGROUND

Known pistons are usually designed cylindrical in a region of the piston crown in order to be able to close off the space for the combustion taking place in a combustion engine. For weight reduction of the piston, the piston hubs for receiving a piston pin are recessed to the inside with respect to the diameter of the piston skirt. Because of this circumstance, material can be saved in the outer regions and a weight reduction achieved by this.

In general, however, even a piston of this type with pin hubs relocated to the inside, has to have skirt wall sections at the height of these pin hubs as well as below these on a part of the circumference, with which it contacts the cylinder wall of the combustion engine after the installation in the cylinder, supporting itself on said cylinder wall. These skirt wall sections in this case are also called supporting skirt wall sections on the pressure and back pressure side, since these are responsible for guiding the piston in the cylinder. The skirt wall sections in this case prevent in particular undesirable tilting about the pin axis in the upper and lower dead centre. The two skirt wall sections or the two skirt walls are connected via box walls, which include the piston pin hubs.

From EP 0 838 587 B2. a piston with skirt walls and box walls connecting these is known, which follow the course of the edges of the skirt walls running in the direction of the piston axis. Here, the width of the two skirt walls is designed growing larger towards the lower end of the piston skirt, as a result of which the two box walls are thus embodied and are designed inclined towards each other in such a manner that their spacing in a lower region is greater than in an upper region. In other words, the connecting walls thus run conically to each other as it were. Because of this, additional material can be saved in particular in those zones, in which the skirt walls can be designed narrower.

From EP 1 348 859 B2. a further piston with sloping box walls is known.

Furthermore, from DE 10 2006 020 861 B4. a single-stage forging method for producing bush-like forged parts in a mould, wherein a pre-pressing blank is placed in a single die impression is known. The die impression in this case comprises an outer die ring, a lower die mandrel through which a lower ejector can be actuated and an upper die mandrel, through which an upper ejector can be actuated, wherein in the impression of the upper die mandrel a negative extraction cone is provided. Following this, the die is closed and the pre-pressing blank is moulded by pressing the die mandrels against each other, wherein through a combined actuation of the ejectors and simultaneous opening of the die an ejection of the finish-forged piston can take place. The method according to the invention serves in particular to extend the tool life of the dies.

SUMMARY

The present invention deals with the problem of stating an improved method for forging a piston skirt, with which in particular a weight-reduced piston with sloping box walls can be produced comparatively easily and thus economically.

According to the invention, this problem is solved through the subjects of the independent claims. Advantageous embodiments are the subject of the dependent claims.

The present invention is based on the general idea of designing a forging method for producing a piston skirt in two stages, wherein in a first stage forging is carried out in a first stage with a first forging die and in a following second stage with a second forging die. The piston skirt comprises two skirt walls in the known manner and two box walls connecting these skirt walls. With the forging method according to the invention, the skirt walls are initially forged at least slightly conically to the outside and the box walls with a hub inside substantially parallel to the piston axis and a hub outside pointing to the inside towards the free end are initially forged with a first forging die. The skirt walls in this case can widen, bent or straight, conically to the outside. Minor widening is required for better de-moulding. Following this, the box walls are moulded in such a manner in the second stage with a second forging die that their hub outside runs substantially parallel to the piston axis or slightly opened towards the outside and their hub inside to the outside towards the free end. During the moulding of the box walls by means of the second forging die, the skirt walls are simultaneously drawn into a position that is preferentially parallel to the piston axis. With the two-stage forging method according to the invention, a piston blank is thus pre-forged in the first forging stage as previously known, wherein the box walls, taking into account the required forging slope, are shaped approximately perpendicularly, i.e. approximately parallel to the piston axis. According to the forging slopes, the hub outside runs obliquely shaped downwards to the inside, while the hub inside runs approximately parallel to the piston axis, i.e. substantially perpendicularly in the present case. During the first forging stage, the skirt region, i.e. the skirt walls, is simultaneously forged with a diameter that increases at least slightly towards the bottom. The increasing diameter in this case does not refer to the wall thickness, but to the conical orientation of the skirt walls. In the following second forging stage, the piston inner shape is conically flared open in a part region of the entire inner height using the second forging die, which in the simplest case only consists of a suitable inner core and the die already used in the first forging stage, as a result of which the outer contour of the hubs position themselves perpendicularly or sloping towards the outside and the box walls sloping towards the bottom and the outside. At the same time, the skirt diameter that was originally too large is drawn inward in the region of the skirt walls and thus deformed corresponding to the final contour of the piston skirt to be forged. The substantial advantage of the method according to the invention is founded in its simplicity, so that even sloping box walls, which in the past were extremely difficult to forge can be produced comparatively easily and thus also economically using the method according to the invention.

With an advantageous further development of the solution according to the invention, the piston skirt is forged from an aluminium alloy and subsequently tempered and/or annealed, in particular subjected to a T7 heat treatment. Through targeted heat treatments, such as for example tempering or solution annealing the mechanical properties in particular of aluminium materials can be additionally raised. The principle of the heat treatment in this case consists in that through solution annealing at temperatures just below liquidus and subsequent quenching in water or oil a supersaturated solid solution is created. Because of this, more foreign atoms are dissolved in the metal lattices than corresponds to the state of equilibrium at room temperature. Through targeted heat treatment and thus targeted artificial ageing, the foreign atoms now present in the metal lattices in supersaturated form are now precipitated through diffusion as dispersive precipitations. With the T7 heat treatment in particular, greater elongations though with lower strength can be achieved through coagulation of the precipitations. The advantage of the T7 heat treatment is that upon temperature loading of the components in practical use no dimensional change occurs and the mechanical properties no longer change either since the structure is largely present in the state of equilibrium. For aluminium alloys, solution-annealing with subsequent artificial ageing is a possibility in particular, during which the strength increase is achieved through precipitation hardening. Solution annealing in this case is carried out for usual piston alloys at temperatures between 480° and 550° C., wherein this temperature is selected so that an adequate quantity of alloying elements are dissolved in the solid solution, so that the hardening effect actually does occur after quenching and ageing. As defining parameters, the solution annealing temperature, the pre-annealing time, the temperature of the coolant, the temperature of the piston skirt at the moment of quenching and the ageing temperature and duration must be mentioned here in particular.

As further advantageous development of the solution according to the invention, the piston or the piston skirt is forged from an iron alloy and subsequently suitably cooled or heat-treated in order to achieve the desired strength and the desired residual stress condition. During subsequent processing, a complete, unitary piston can be produced from the forged part or a piston lower part, which in combination with a piston upper part produces a piston through joining (e.g. welding, gluing, soldering etc.) or screwing.

Further important features and advantages of the invention are obtained from the subclaims, from the drawings and from the associated Figure description by means of the drawing.

It is to be understood that the features mentioned above and still to be explained in the following cannot only be used in the respective combination stated, but also in other combinations or by themselves without leaving the scope of the present invention.

BRIEF DESCRIPTION OF THE DRAWINGS

Preferred exemplary embodiments are shown in the drawings and are explained in more detail in the following description, wherein same reference characters refer to same or similar or functionally same components.

There it shows, in each case schematically.

DETAILED DESCRIPTION

Figure 1:
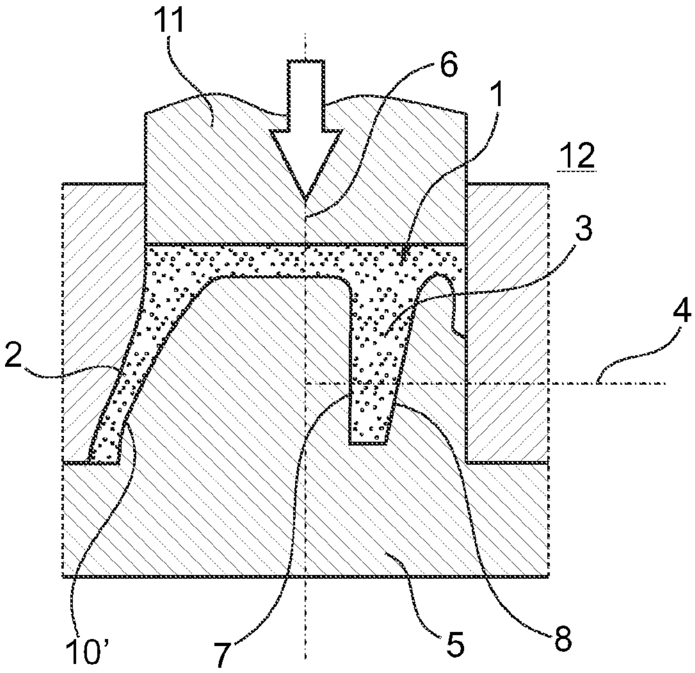
FIG. 1 a two-stage forging method according to the invention for producing a piston skirt in a first stage, FIG. 2 a representation of the two-stage forging method according to the invention in a second forging stage, FIG. 3 a representation as in FIG. 1, however with a divisible, closed second forging die, during the first forging stage, FIG. 4 a representation as in FIG. 2, however with spread-open two-piece second forging die during the second forging stage.
Figure 2:
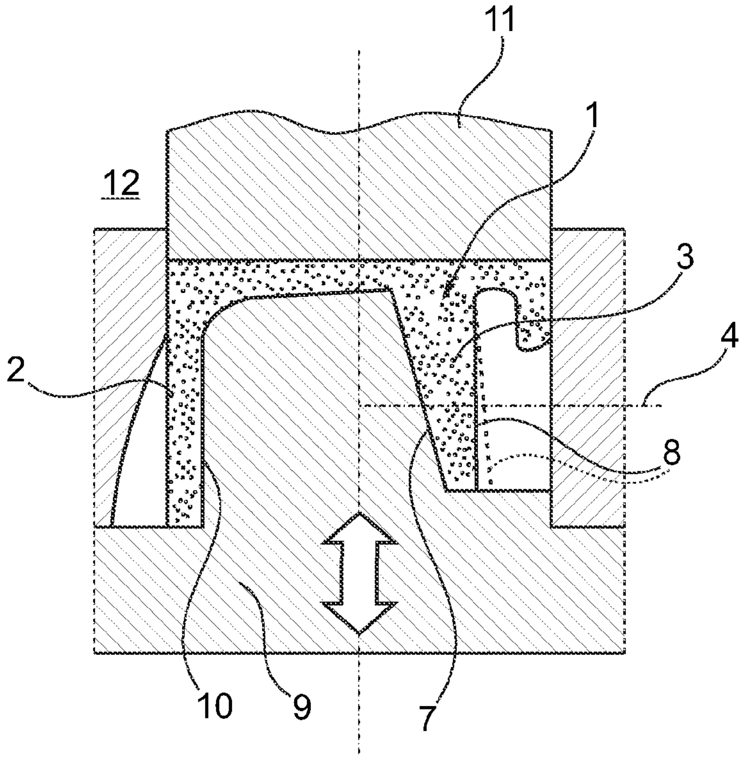

Corresponding to FIGS. 1 to 4, a forging method for producing a piston or a piston skirt 1 is shown, which comprises two skirt walls 2 and two box walls 3 connecting these skirt walls 2. FIGS. 1 and 2 in this case are each divided into a left and right Figure half, wherein the left Figure half shows a sectional representation orthogonally to a pin axis 4 and the right Figure half each a sectional representation parallel to the pin axis 4. Compared with this, FIGS. 3 and 4 each show a complete sectional representation parallel to the pin axis 4.

Figure 3:
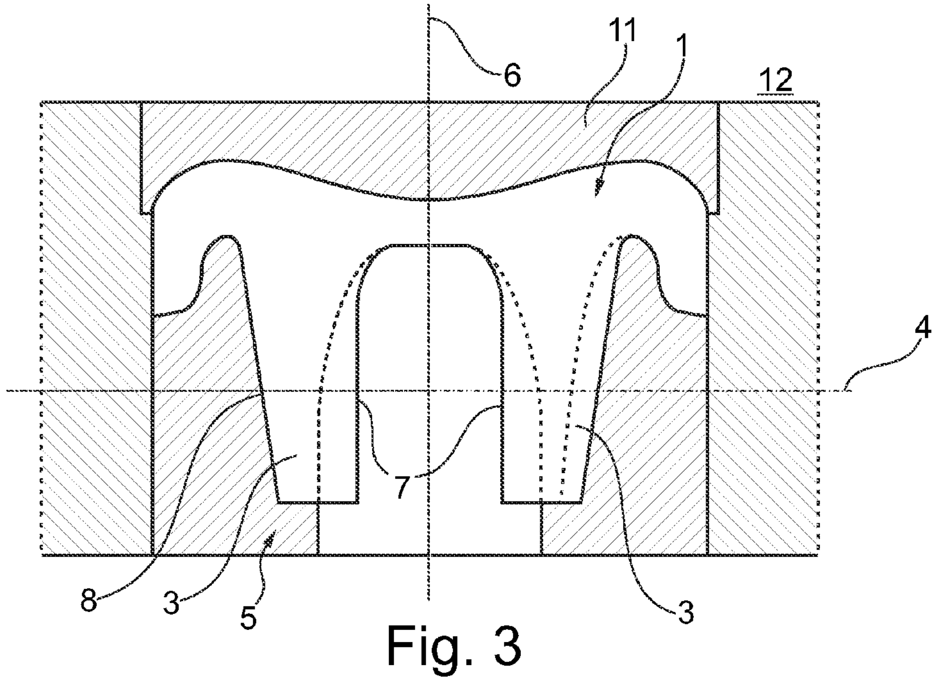
Figure 4:
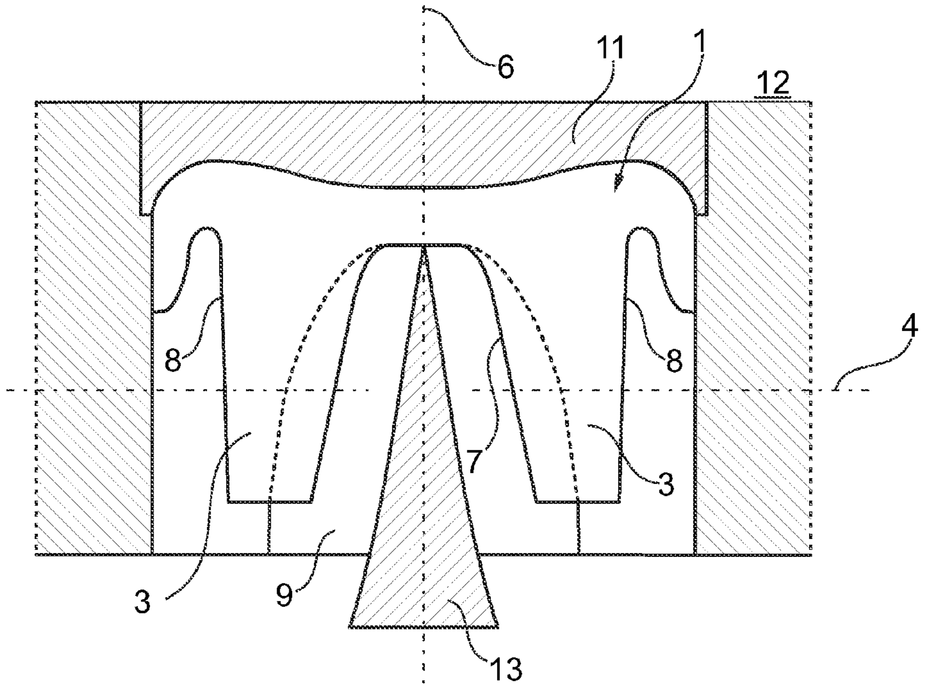

FIGS. 1 and 3 in each case show a first forging stage of the altogether two-stage forging method according to the invention, whereas in FIGS. 2 and 4 the respective associated second forging stage is shown. According to the invention, the skirt walls 2 are now forged in the first forging stage/stage (see FIGS. 1 and 3) with a first forging die 5 at least slightly conically to the outside and the box walls 3 with a hub inside 7 that is approximately parallel substantially to the piston axis 6 and a hub outside 8 pointing towards the free end, i.e. in the present case downwards and to the inside with a first forging die 5. The skirt walls 2 in this case are not noticeable in the sectional representations according to FIGS. 3 and 4, since they are located above or below the Figure plane. In the second forging stage/stage of the forging method according to the invention (see FIGS. 2 and 4), the box walls 3 are now moulded in such a manner with a second forging die 9, that their hub outside 8 substantially point parallel to the piston axis 6 or slightly to the outside (see interrupted drawn line in FIG. 2) and their hub insides 7 towards the free end, i.e. in the present case downwards to the outside. While moulding the box walls 3 by means of the second forging die 9, the skirt walls 2 are simultaneously drawn into a position that is approximately parallel to the piston axis 6 and because of this define the outer diameter of the piston skirt 1.

In general, obviously, merely one piston skirt 1 or one piston lower part can be forged with the forging method according to the invention, or a complete piston. During moulding, i.e. while flaring the box walls 3 by means of the second forging die 9 during the second forging stage, the skirt walls 2 are drawn inward through the flaring of the box walls 3 so far until they contact the outer surface 10 of the second forging die 9 that is parallel to the piston axis 6. Contrary to the outer surface 10' of the first forging die 5, this outer surface 10 does not run conically but in the sectional representation according to FIG. 2, approximately parallel to the piston axis 6.

The first and the second forging die 5, 9 during the respective forging stage are pressed against a swage 11, wherein the piston skirt 1 located between the forging die 5, 9 and the swage 11 during the entire forging method either remains in the swage 11, i.e. in a forging device 12 accommodating the swage or between the forging with the first forging die 5 and the forging with the second forging die 9, i.e. between the first and the second forging stage, is removed and heated. Obviously, direct heating within the forging device 12 after completion of the first forging stage is also conceivable.

The piston skirt 1 can for example be forged from an aluminium alloy, a magnesium alloy, a ceramic or an iron-based material, wherein increasingly plastics are also conceivable. For heat treating especially a piston skirt 1 forged from an aluminium alloy, this can subsequently be tempered and/or annealed, in particular subjected to a so-called T7 heat treatment. With such a heat treatment, which is usually performed after quenching, the foreign atoms present in supersaturated form in the metal lattice are to be precipitated as dispersive precipitations through fusion. With the previously performed quenching, for example in oil or water, more foreign atoms have been dissolved in the metal lattice than would correspond to the state of equilibrium at room temperature. This stress status can be reduced through the subsequent annealing or heat treating.

Considering the second forging die 9 according to FIG. 4, it is noticeable that it is designed for example like the first forging die 5 according to FIG. 3 as split forging die. According to FIG. 3, the first forging stage in this case is performed analogously to the first forging stage of FIG. 1, wherein the hub insides 7 are moulded parallel to the piston axis 6 and the hub outsides 8 running obliquely downwards and to the inside. In the following second forging stage, the first forging die 5 is replaced by the second forging die 9, wherein the second forging die 9 through spreading open, for example by means of a wedge 13, deforms the box walls 3 in such a manner that their hub outsides 8 are now run parallel to the piston axis 6 and their hub insides 7 obliquely thereto. At the same time, the skirt walls 2 are drawn to the inside, which however is not shown in FIGS. 3 and 4 because of the chosen sectional representations.

With the method according to the invention and also with such a forging device 12 according to the invention, pistons or piston skirts 1 with oblique box walls 3 can be produced comparatively easily and economically, wherein with the sloping box walls 3 a material saving and thus a weight reduction can be achieved.

The invention claimed is:

1. A forging method for producing a piston skirt of a piston having a piston axis, comprising:
- pressing a first for against a swage;
- forging two skirt walls at least slightly conically away from the piston axis via the first forging die;
- forging two box walls that connect the two skirt walls, wherein each box wall has a hub inside that is substantially parallel to the piston axis and a hub outside extending from a free end of the box wall at least slightly away from the piston axis via the first forging die;
- pressing a second forging die against a swage;
- moulding the box walls via the second forging die, wherein the hub outside of each box wall runs at least one of substantially parallel to the piston axis and slightly inwardly from the free end to the hub inside; and
- drawing, simultaneously with moulding the box walls, the skirt walls into a position that is approximately parallel to the piston axis;
- wherein the piston skirt is located between one of the forging dies and the swage throughout the method.

2. The method according to claim 1, wherein during the moulding of the box walls the skirt walls contact the second forging die on a surface that is approximately parallel to the piston axis.

3. The method according to claim 1, further comprising heating the piston skirt between the forging with the first forging die and the forging with the second forging die.

4. The method according to claim 1, wherein the piston skirt is forged from at least one of an aluminum alloy, a magnesium alloy, a ceramic and an iron-based material.

5. The method according to claim 1, wherein the piston skirt is forged from an aluminum alloy and is subsequently at least one of tempered and annealed.

6. The method according to claim 5, wherein the piston skirt is subjected to a T7 heat treatment.

7. The method according to claim 1, further comprising forging a piston crown together with the piston skirt.

8. The method according to claim 1, wherein at least the second forging die is designed as a split forging die and further comprising spreading open the split forging die by a wedge for moulding the box walls.

9. The method according to claim 1, wherein during the moulding of the box walls the skirt walls contacting the second forging die on a surface that is approximately parallel to the piston axis.

10. The method according to claim 1, further comprising heating the piston skirt between the forging with the first forging die and the forging with the second forging die.

11. A method for producing a piston skirt of a piston having a piston axis, comprising:
- pressing the first forging die against a swage;
- forging two skirt walls at least slightly conically away from the piston axis via the first forging die;
- forging two box walls that connect the two skirt walls, wherein each box wall has a hub inside that is substantially parallel to the piston axis and a hub outside extending from a free end of the box wall at least slightly away from the piston axis via the first forging die;
- pressing the second forging die against the swage; and
- moulding the box walls via the second forging die, wherein the hub outside of each box wall runs at least one of substantially parallel to the piston axis and slightly inwardly from the free end to the hub inside, and the skirt walls contact the second forging die on a surface that is approximately parallel to the piston axis;
- drawing, simultaneously with moulding the box walls, the skirt walls into a position that is approximately parallel to the piston axis
- wherein the piston skirt is located between one of the forging dies and the swage throughout the method.

* * * * *

UNITED STATES PATENT AND TRADEMARK OFFICE

CERTIFICATE OF CORRECTION

PATENT NO. : 8,904,634 B2
APPLICATION NO. : 13/533604
DATED : December 9, 2014
INVENTOR(S) : Ißler It is certified that error appears in the above-identified patent and that said Letters Patent is hereby corrected as shown below:

In the Claims:

At column 5, claim 1, line 35, please replace "for" with "forging die".

Signed and Sealed this
Second Day of June, 2015

Michelle K. Lee

Michelle K. Lee
*Director of the United States Patent and Trademark Office*